June 12, 1934.  G. A. BIGGS  1,962,384
APPARATUS FOR ADJUSTING HYDRAULIC TURBINE RUNNERS
Filed Dec. 15, 1932   2 Sheets-Sheet 1
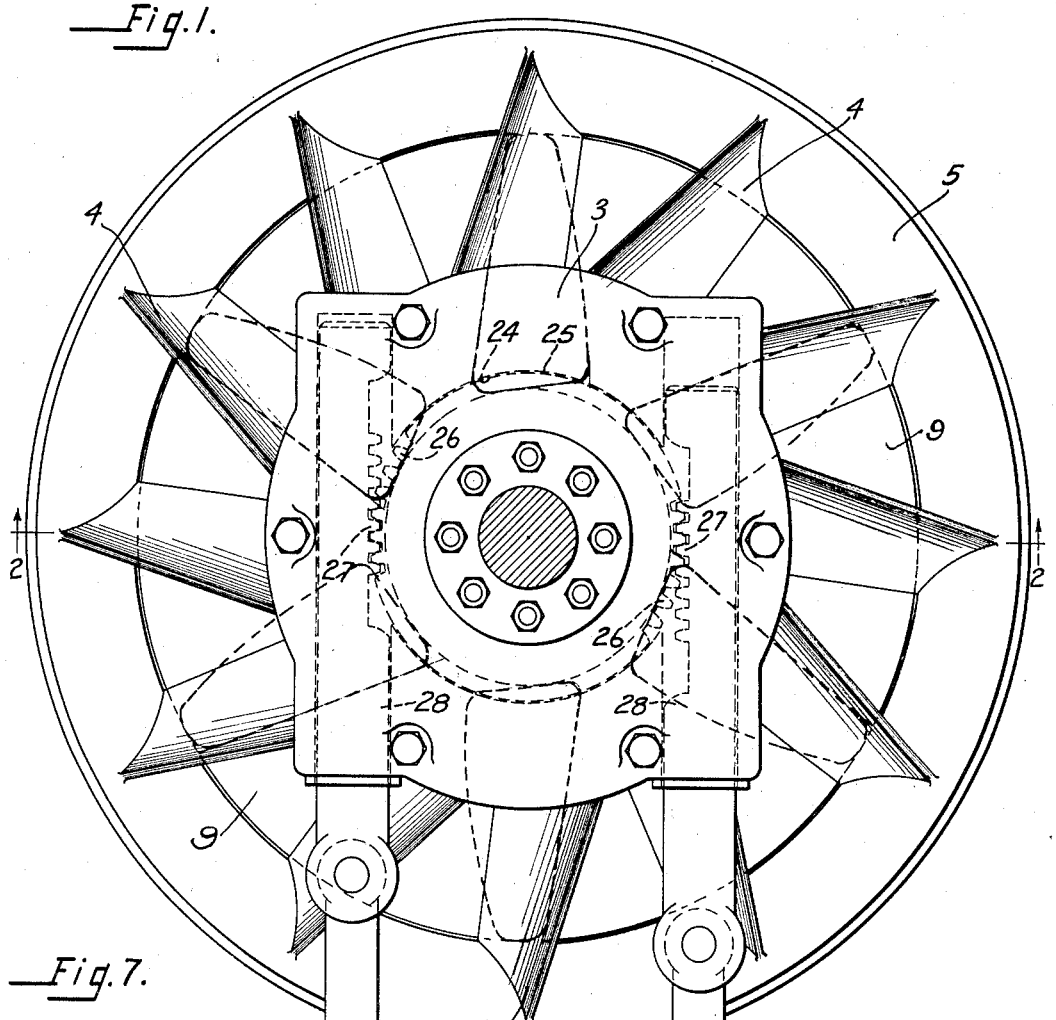
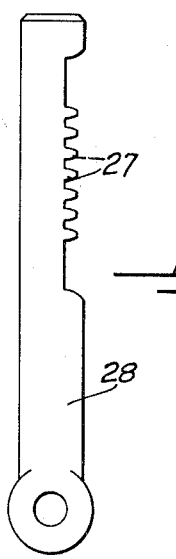
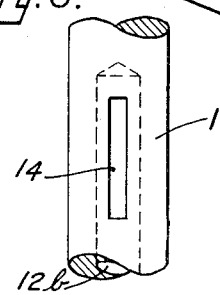
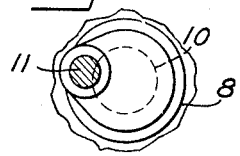
INVENTOR
GEORGE A. BIGGS.
BY
ATTORNEYS

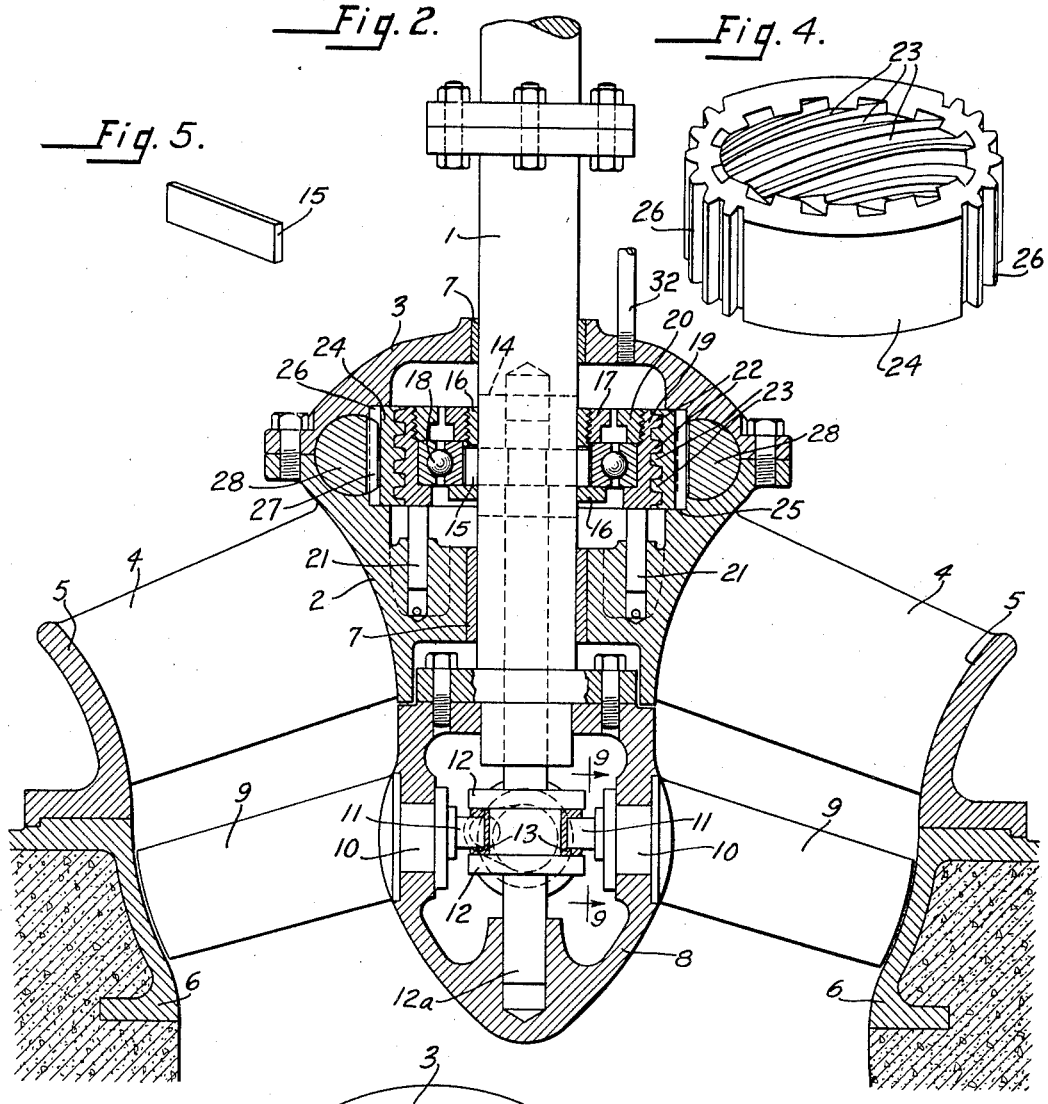

Patented June 12, 1934

1,962,384

UNITED STATES PATENT OFFICE 1,962,384

APPARATUS FOR ADJUSTING HYDRAULIC TURBINE RUNNERS

George A. Biggs, Springfield, Ohio, assignor to The James Leffel and Company, Springfield, Ohio, a corporation of Ohio Application December 15, 1932, Serial No. 647,355

13 Claims. (Cl. 253—148)

This invention relates to improvements in turbines, and more particularly to improvements in a turbine runner, the buckets mounted thereon, and the means by which the buckets are adjusted.

It is an object of this invention to provide, in connection with a runner shaft, a housing for supporting the shaft, with means in the housing for adjusting the buckets, rotatably supported on the runner.

It is also an object of this invention to provide, in connection with a runner shaft having a runner thereon, a housing supported by fixed blades and having therein means for adjusting the buckets on the runner, said buckets being substantially parallel with the blades.

It is also an object of this invention to provide in connection with a runner shaft and the runner thereon, a plurality of fixed guide blades for supporting the runner and its shaft, and a plurality of buckets rotatably mounted on the runner and projecting therefrom at an angle to the shaft, but supported by an axle or hub extending horizontally at substantially a right angle to the runner shaft.

It is a further object of this invention to provide, in connection with a runner and runner shaft, buckets adapted to be adjusted to control the flow of water by being able to close and cut off the water while at the same time eliminating ordinary movable gate mechanism.

It is a further object of this invention to provide, in connection with a runner and runner shaft, a plurality of adjustable, diagonally disposed buckets having horizontally extending shafts or hubs supported by the runner.

These and other advantages will appear from the following description taken in connection with the drawings.

Referring to the drawings:

Figure 1 is a top plan view showing applicant's apparatus for adjusting the buckets of a turbine.

Figure 2 is a section on the line 2—2 of Figure 1.

Figure 3 is a plan view of the lower vane housing with the runner shaft in section and the upper housing removed.

Figure 4 is a perspective of the nut ring.

Figure 5 is a perspective of an adjusting key.

Figure 6 is a perspective of an adjusting sleeve to be mounted on the runner shaft.

Figure 7 is a view showing one of the rack bars for rotating the nut ring shown in Figure 4.

Figure 8 is a view showing a fragment of the runner shaft with the key slot therein.

Figure 9 is a section on the line 9—9 of Figure 2.

Figure 1 shows in general a top plan view of a hydraulic turbine, to which applicant's adjustment mechanism is attached. The runner shaft 1 is supported by two housings, a lower housing 2 and an upper housing 3, supported on the lower housing. These housings are supported by means of stationary guide vanes 4, extending downwardly from the lower housing to a gate ring 5, which rests upon and is supported by a tube ring 6.

In each of the housings 2 and 3 is a bearing 7 for the runner shaft 1. To the lower end of this shaft is attached a runner 8 by means of suitable bolts or screws. The runner is hollow and provides a cavity for bucket-rotating mechanism. The buckets indicated by the numeral 9, extend from the runner at an acute angle to its axis of rotation, and each has on one end a horizontally disposed hub or shaft 10, which is suitably journalled in a bearing provided therefor in the outer periphery of the runner.

As is apparent from Figure 2, the gate or guide vane 4 and the bucket 9 are substantially parallel to each other, while the shaft or hub of the bucket 9 is substantially horizontal and at right angles to the runner shaft. On the inner end of each hub or shaft is a crank spindle 11, which is located off center on the hub or shaft 10 and extends between two collars 12, located on a shaft 12a extending upwardly through a hole 12b in the runner shaft. These collars are spaced apart and are provided with wipers 13 between which the crank spindles 11 move. The buckets project downwardly and outwardly and are adapted to close, and shut off the water.

Extending through the runner shaft substantially in a line with the point of junction of the two housings is a vertically disposed slot 14, in which is a key member 15 which extends at each end beyond the periphery of the runner shaft. The ends of this key rest in a sleeve 16, shown in Figure 6, which fits around the runner shaft and is adapted to be moved longitudinally thereof by the key 15. This key is attached to the shaft 12a in some suitable manner and causes the shaft to move up and down so that the buckets 9 are rotated, due to the action of the collars 12 upon the spindles 11.

Threaded on the sleeve and above the ends of the key is a nut 17. This nut cooperates with the sleeve in holding the sleeve on the key and provides with the sleeve a seat for the ends of the key. Fitting around the sleeve is a double thrust bearing 18, surrounded by a second sleeve 19 which cooperates with the sleeve 16 in forming supports for the double thrust bearing. This double thrust bearing permits the sleeves to rotate independently of each other, but so connects the two sleeves that they must move longitudinally of the runner shaft with each other.

The second sleeve is supported on the double thrust bearing by means of a screw ring 20, which fits on top of one of the members of the double thrust bearing. Extending downwardly from the sleeve 19 is a plurality of pins 21 which project into suitably formed holes in the lower housing for the purpose of guiding the sleeves in their movements longitudinally of the runner shaft.

Around the outer periphery of the sleeve 19 are coarse pitched threads 22 which engage similarly pitched threads 23 on the interior of a stationary nut ring 24 which is stationary with relation to the housing and fits in and is adapted to rotate in a seat 25 formed in the two housings. On the periphery of this nut ring are two sets of teeth 26, each set being engaged by teeth 27 of an adjusting bar 28. This bar is shown in Figure 7 and is shown in dotted lines in Figure 1.

The numeral 29 is used to designate a shaft, which may be suitably attached to a governor mechanism by which it is rotated, or it may be rotated by hand for adjusting the buckets on the runner. To this shaft is attached a pair of arms 30, which extend in opposite directions. To each arm is pivoted one end of a link 31. The other end of each of these links is pivoted to one end of one of the bars 28 so that when the shaft 29 rotates the bars 28 move back and forth, and cause the nut ring to rotate. The rotation of the nut ring causes the sleeve 19 to move up or down, depending upon the direction of the rotation of the nut ring.

As the two sleeves move up and down they carry with them the key, which also carries with it the shaft 12a. The vertical movements of the shaft 12a will cause the buckets 9 to rotate, due to the action of the collars 12 on the crank spindles.

For the purpose of providing lubricant to the housings a pipe 32 is located in the upper housing. The double thrust bearings consist of two annular members, one suitably located in the sleeve 19 while the other is located in the sleeve 16, and separated by means of ball bearings so that the two sleeves may rotate with respect to one another but cannot move longitudinally.

When the sleeve 19 is moved upwardly it carries with it the sleeve 16 and the key 15, thereby elevating the two collars on the lower end of the shaft 12a. When the sleeves 16 and 19 are lowered they cause the two collars on shaft 12a to lower, and again shift the buckets in the opposite direction.

It will be understood that I desire to comprehend within my invention such modifications as come within the scope of the claims and the invention.

Having thus fully described my invention, what I claim as new and desire to secure by Letters Patent, is:

1. In a turbine, in combination with a shaft having a runner thereon, a support for the shaft and the runner, said support including a housing having thereon downwardly and outwardly extending guide vanes, a plurality of downwardly and outwardly extending buckets, each bucket having a hub rotatably mounted in the runner, a crank spindle mounted on each hub, and means in the housing operating on the spindles for rotating the buckets, said means including a stationary ring, a sleeve movable longitudinally of the shaft by the ring, and means connecting the sleeve to the crank spindles, said ring being stationary with relation to the support.

2. In a turbine, a shaft having a runner on one end, said shaft having an axially disposed hole in its runner end and a transverse slot at the end of the hole remote from the runner, buckets rotatably mounted on the runner, a crank pin on each bucket, a shaft in the hole connected at one end to the pins, a key on the other end of the last-named shaft extending through the slot, and means engaging the ends of the key for moving the last-named shaft and thereby rotating the buckets, said means including a sleeve on the first-named shaft engaging the ends of the key and a second sleeve in threaded engagement with the first-named sleeve, whereby a rotation of the second sleeve causes the first-named sleeve to move longitudinally of the first-named shaft to rotate the buckets.

3. In a turbine, in combination with a gate ring, a housing having inclined guide vanes attached to the gate ring and supporting the housing, a shaft rotatably supported by the housing, a runner on the shaft adjacent the housing, buckets on the runner, each runner being substantially parallel to a vane and having thereon a horizontally disposed hub journalled in the runner, and means in the housing connected to the hubs for rotating the buckets, said means including a sleeve on the shaft connected to the hubs and a second sleeve rotatably mounted in the housing and in threaded engagement with the first sleeve, whereby the rotation of the second sleeve will cause the first-named sleeve to move longitudinally of the shaft.

4. In a turbine, in combination with a gate ring and a tube ring, a housing having guide vanes thereon attached to the gate ring for supporting the housing, a shaft rotatably supported by the housing, a runner on the shaft adjacent the housing, buckets having horizontally extending hubs rotatably mounted in the runner, said buckets extending from the runner at an acute angle to the axis of rotation, and means in the housing operatively connected to the hubs for rotating the buckets, said buckets being adapted in cooperation with the tube ring to close and cut off the water.

5. In a turbine, a housing, a shaft rotatably mounted in the housing, a runner on the shaft adjacent the housing, buckets, each having a hub thereon journalled in the runner, a nut ring supported in the housing, means for rotating the nut ring, a sleeve on the shaft, a second sleeve around the first-named sleeve, a thrust bearing between the sleeves, means connecting the second sleeve to the hubs for rotating the buckets, and a connection between the nut ring and the first-named sleeve, whereby a rotation of the nut ring will move both sleeves longitudinally of the shaft and rotate the buckets, said buckets being adapted to close and shut off the water.

6. In a turbine, a housing having a seat therein, a nut ring in the seat, said ring having on its periphery two sets of teeth, a rack bar engaging each set of teeth for rotating said ring, a sleeve in threaded engagement with said ring, means to prevent the rotation of the sleeve, a shaft rotatably mounted in the housing, a second sleeve mounted for movement on the shaft, a thrust bearing between the sleeves whereby they can rotate but not move laterally with respect to each other, a runner on the shaft, buckets on the runner, and a connection between the second sleeve and the buckets whereby the second sleeve cannot rotate on the shaft and on rotation of the nut ring the buckets will rotate.

7. In a turbine, a housing having a seat therein, a nut ring in the seat, said ring having on its periphery two sets of teeth, a rack bar engaging each set of teeth for rotating said ring, a sleeve in threaded engagement with said ring, means to prevent the rotation of the sleeve, a shaft rotatably mounted in the housing, a second sleeve mounted for movement on the shaft, a thrust bearing between the sleeves whereby they can rotate but not move laterally with respect to each other, a runner on the shaft, buckets on the runner, a connection between the second sleeve and the buckets whereby the second sleeve cannot rotate on the shaft and on rotation of the nut ring the buckets will rotate, and common means for operating both rack bars to rotate the nut ring.

8. In a turbine, a housing having a seat therein, a nut ring in the seat, said ring having on its periphery two sets of teeth, a rack bar engaging each set of teeth for rotating said ring, a sleeve in threaded engagement with said ring, means to prevent the rotation of the sleeve, a shaft rotatably mounted in the housing, a second sleeve mounted for movement on the shaft, a thrust bearing between the sleeves whereby they can rotate but not move laterally with respect to each other, a runner on the shaft, buckets on the runner, a connection between the second sleeve and the buckets whereby the second sleeve cannot rotate on the shaft and on rotation of the nut ring the buckets will rotate, and common means for operating both rack bars to rotate the nut ring, said common means including a shaft having an arm thereon connected to each rack bar.

9. In combination, a runner shaft having a hub and a plurality of adjustable blades thereon, a second hub surrounding said shaft and superimposed thereover having a plurality of stationary blades thereon, and means rotatably mounted in the second hub connected with means in the first hub for adjusting the buckets on the first hub.

10. In combination, a runner shaft having a hub and a plurality of adjustable blades thereon, a second hub surrounding said shaft and superimposed thereover having a plurality of stationary blades thereon, means rotatably mounted in the second hub connected with means in the first hub for adjusting the buckets on the first hub, and romotely controlled means outside of said runner shaft adapted to adjust said adjusting means.

11. In combination, a runner shaft having adjustable buckets thereon, adjusting means for said buckets comprising a stationary hub, a ring gear mounted therein having a worm on the interior thereof, a worm gear engaging therewith, a sleeve on said shaft operatively connected to the buckets and a bearing between said worm gear and said sleeve, whereby a rotation of the ring gear will reciprocate the sleeve on the shaft.

12. In combination, a stationary hub, a horizontally disposed remotely actuated rack member slidably mounted in said hub, a ring gear engaging therewith having a worm on the interior thereof, a worm gear, means for guiding said worm gear vertically, a collar actuated by said worm gear, and means on said collar adapted to adjust the turbine blades.

13. In combination, a stationary hub, a horizontally disposed remotely actuated rack member slidably mounted in said hub, a ring gear engaging therewith having a worm on the interior thereof, a worm gear, means for guiding said worm gear vertically, a collar actuated by said worm gear, means on said collar adapted to adjust the turbine blades, and a bearing between said collar and said gear.

GEORGE A. BIGGS.